(12) United States Patent
Rozendaal (10) Patent No.: US 8,917,818 B2
(45) Date of Patent: Dec. 23, 2014

(54) METHOD AND SYSTEM FOR DETERMINING A NUMBER OF LOAD COILS IN A TRANSMISSION LINE

(71) Applicant: JDS Uniphase Corporation, Milpitas, CA (US)

(72) Inventor: Evert H. Rozendaal, Roanoke, VA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 14/157,291

(22) Filed: Jan. 16, 2014

(65) Prior Publication Data

US 2014/0198902 A1 Jul. 17, 2014

Related U.S. Application Data

(60) Provisional application No. 61/753,633, filed on Jan. 17, 2013.

(51) Int. Cl.
| | | |
|---|---|---|
| *H04M 1/24* | (2006.01) | |
| *H04M 3/08* | (2006.01) | |
| *H04M 3/22* | (2006.01) | |
| *H04M 3/30* | (2006.01) | |

(52) U.S. Cl.
CPC ..................................... *H04M 3/306* (2013.01)
USPC ............................................ 379/24; 379/1.01

(58) Field of Classification Search
CPC ..... H04M 3/306; H04M 3/2209; H04M 3/30; H04M 3/305; H04M 3/304; H04M 3/301; H04M 3/308; H04M 1/24

USPC .......................................... 379/1.01, 1.04, 24
See application file for complete search history.

(56) References Cited

U.S. PATENT DOCUMENTS

| | | | |
|---|---|---|---|
| 4,087,657 A | 5/1978 | Peoples | 324/615 |
| 5,404,388 A | 4/1995 | Eu | 379/24 |
| 5,881,130 A | 3/1999 | Zhang | 379/27.08 |
| 6,263,047 B1 * | 7/2001 | Randle et al. | 379/31 |
| 6,631,178 B1 | 10/2003 | Blackwell et al. | 379/1.04 |
| 6,668,041 B2 | 12/2003 | Kamali et al. | 379/1.04 |
| 7,395,162 B2 * | 7/2008 | Fertner et al. | 702/57 |
| 7,436,935 B2 * | 10/2008 | Faulkner | 379/1.04 |
| 7,778,317 B2 | 8/2010 | Jin | 375/224 |
| 7,844,436 B2 | 11/2010 | Lindqvist et al. | 703/13 |
| 2002/0067802 A1 * | 6/2002 | Smith et al. | 379/1.04 |
| 2004/0230390 A1 * | 11/2004 | Galli et al. | 702/66 |
| 2004/0267678 A1 * | 12/2004 | Gao et al. | 706/2 |
| 2005/0285935 A1 * | 12/2005 | Hodges et al. | 348/14.08 |
| 2007/0206668 A1 * | 9/2007 | Jin | 375/224 |
| 2009/0024340 A1 * | 1/2009 | Borjesson et al. | 702/65 |
| 2010/0156553 A1 * | 6/2010 | Lindqvist et al. | 333/32 |

* cited by examiner

*Primary Examiner* — Quoc D Tran
(74) *Attorney, Agent, or Firm* — JDS Uniphase Corporation (57) ABSTRACT

A method and system for determining a number of load coils in a transmission line are provided. An impulse response of the transmission line is calculated from a characteristic impedance of the transmission line. A number of complex conjugate pole pairs of a transfer function of the impulse response is then determined. Thereby, the number of load coils in the transmission line, which is equal to the number of complex conjugate pole pairs, is determined.

18 Claims, 11 Drawing Sheets

METHOD AND SYSTEM FOR DETERMINING A NUMBER OF LOAD COILS IN A TRANSMISSION LINE

CROSS-REFERENCE TO RELATED APPLICATIONS

This application claims priority from U.S. Provisional Patent Application No. 61/753,633 to Rozendaal, filed on Jan. 17, 2013, which is incorporated herein by reference.

TECHNICAL FIELD OF THE INVENTION

The present invention relates to detecting load coils in a transmission line. More particularly, the present invention relates to determining the number of load coils in a transmission line by using the characteristic impedance of the transmission line.

BACKGROUND OF THE INVENTION

A load coil is an inductor that is inserted into a circuit to increase its inductance. Load coils are often inserted into a transmission line, e.g., a loop, to reduce amplitude and phase distortions of signals transmitted over the transmission line. As a result of their relatively high inductance, load coils generate poles in the transfer function representing the characteristic impedance of the transmission line.

Figure 1:
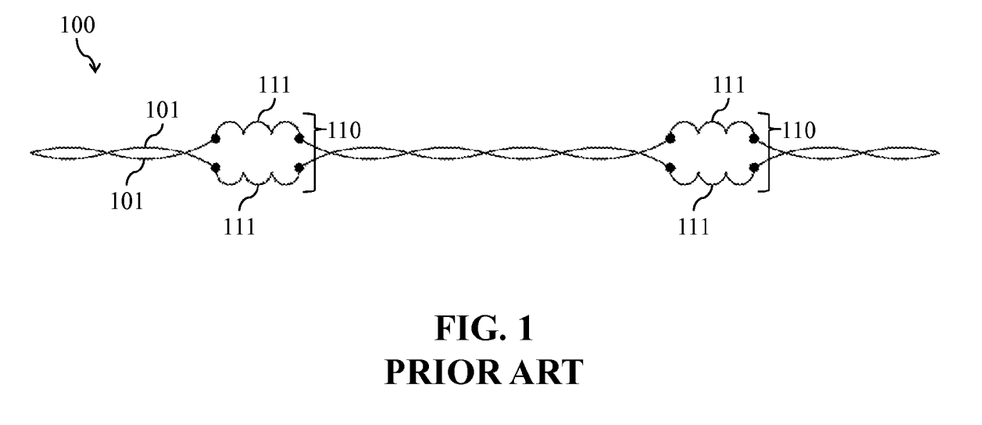
FIG. 1 is a schematic illustration of a twisted-pair transmission line including two load coils.

With reference to FIG. 1, in the past, load coils 110 were inserted periodically, e.g., at a spacing on the order of kilometers, into a twisted-pair transmission line 100 used for plain old telephone service (POTS) to improve the quality of voice signals transmitted over the transmission line 100. Typically, each load coil 110 includes two windings 111, each connected in series with one wire 101 of the twisted-pair transmission line 100.

However, the insertion of load coils into the transmission line leads to a rapid increase in attenuation above a cut-off frequency that depends on the spacing of the load coils. Typically, transmission lines including load coils at a spacing suitable for POTS have a cut-off frequency just above the upper voice frequency limit of 3.4 kHz. Therefore, in order to use these loaded transmission lines for services, e.g., digital subscriber line (DSL) services, operating at higher frequencies, e.g., above 10 kHz, the load coils must be detected and removed.

One prior-art technique for determining the number of load coils in a transmission line involves finding, e.g., by taking a derivative, and counting local maxima in the characteristic impedance of the transmission line. Variations of this technique are disclosed in U.S. Pat. No. 7,778,317 to Jin, issued on Aug. 17, 2010, in U.S. Pat. No. 7,395,162 to Fertner et al., issued on Jul. 1, 2008, in U.S. Pat. No. 5,881,130 to Zhang, issued on Mar. 9, 1999, in U.S. Pat. No. 5,404,388 to Eu, issued on Apr. 4, 1995, and in U.S. Pat. No. 4,087,657 to Peoples, issued on May 2, 1978, for example. Unfortunately, when the local maxima are close to one another or overlapping, it is often difficult to correctly determine the number of local maxima.

SUMMARY OF THE INVENTION

Accordingly, one aspect of the present invention relates to a method of determining a number of load coils in a transmission line having a characteristic impedance, the method comprising: calculating an impulse response of the transmission line from the characteristic impedance of the transmission line; and determining a number of complex conjugate pole pairs of a transfer function of the impulse response to thereby determine the number of load coils in the transmission line, wherein the number of complex conjugate pole pairs is equal to the number of load coils.

Another aspect of the present invention relates to a system for determining a number of load coils in a transmission line having a characteristic impedance, the system comprising: a processing unit for calculating an impulse response of the transmission line from the characteristic impedance of the transmission line; and for determining a number of complex conjugate pole pairs of a transfer function of the impulse response to thereby determine the number of load coils in the transmission line, wherein the number of complex conjugate pole pairs is equal to the number of load coils.

BRIEF DESCRIPTION OF THE DRAWINGS

The present invention will be described in greater detail with reference to the accompanying drawings, wherein.

DETAILED DESCRIPTION OF THE INVENTION

The present invention provides a method and system for determining the number of load coils in a transmission line.

Advantageously, the present invention allows the number of load coils in the transmission line to be determined in a simple and straightforward manner by using the characteristic impedance of the transmission line.

The characteristic impedance of the transmission line is the impedance of the transmission line as a function of frequency, i.e., the frequency response of the transmission line. The characteristic impedance is a property of the transmission line and is independent of the method and apparatus used to measure the characteristic impedance. Several suitable measurement methods and apparatus are available, any of which may be used by the present invention.

Figure 2A:
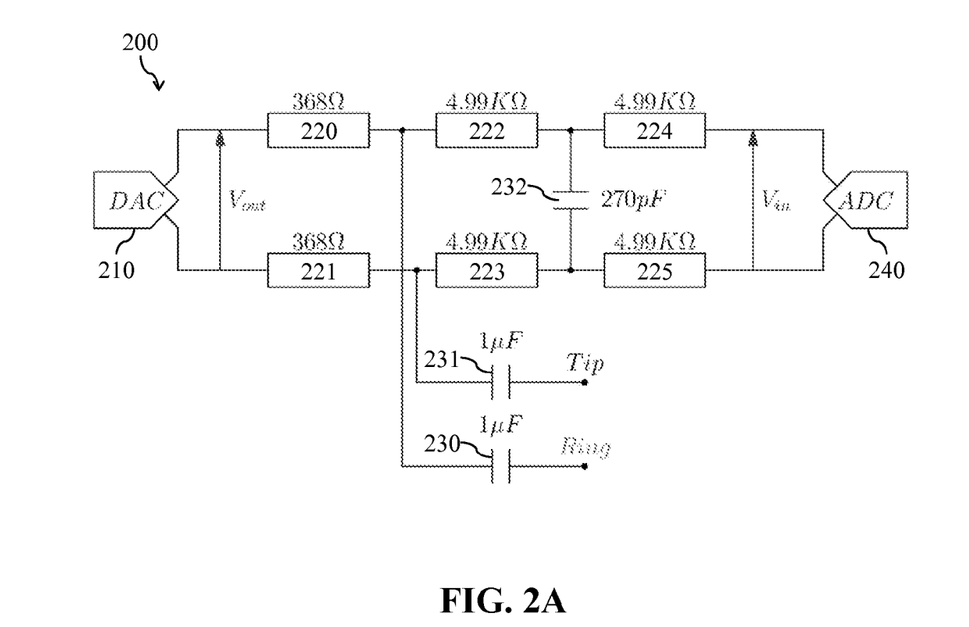
FIG. 2A is a circuit diagram of an exemplary embodiment of a measurement circuit.

With reference to FIG. 2A, an exemplary measurement circuit 200 for measuring the characteristic impedance of a transmission line includes a digital-to-analog converter (DAC) 210, resistors 220-225, capacitors 230-232, and an analog-to-digital converter (ADC) 240. The DAC 210 is used to generate sine waves of different frequencies, e.g., 64 different frequencies up to about 6 kHz. The different frequencies are, preferably, evenly spaced to facilitate the subsequent calculation of an inverse Fourier transform.

The sine waves are sent to the ADC 240 via the resistors 220-225 and capacitors 230-232 as illustrated in FIG. 2A. The measurement circuit 200 is connected to the tip and ring of the loop, i.e., the two wires of the transmission line. The impedance of the transmission line at the different frequencies will change the voltage $V_{in}$ at the input of the ADC 240. These changes in voltage at the different frequencies are used to determine the characteristic impedance $Z_0$ of the transmission line.

Figure 2B:
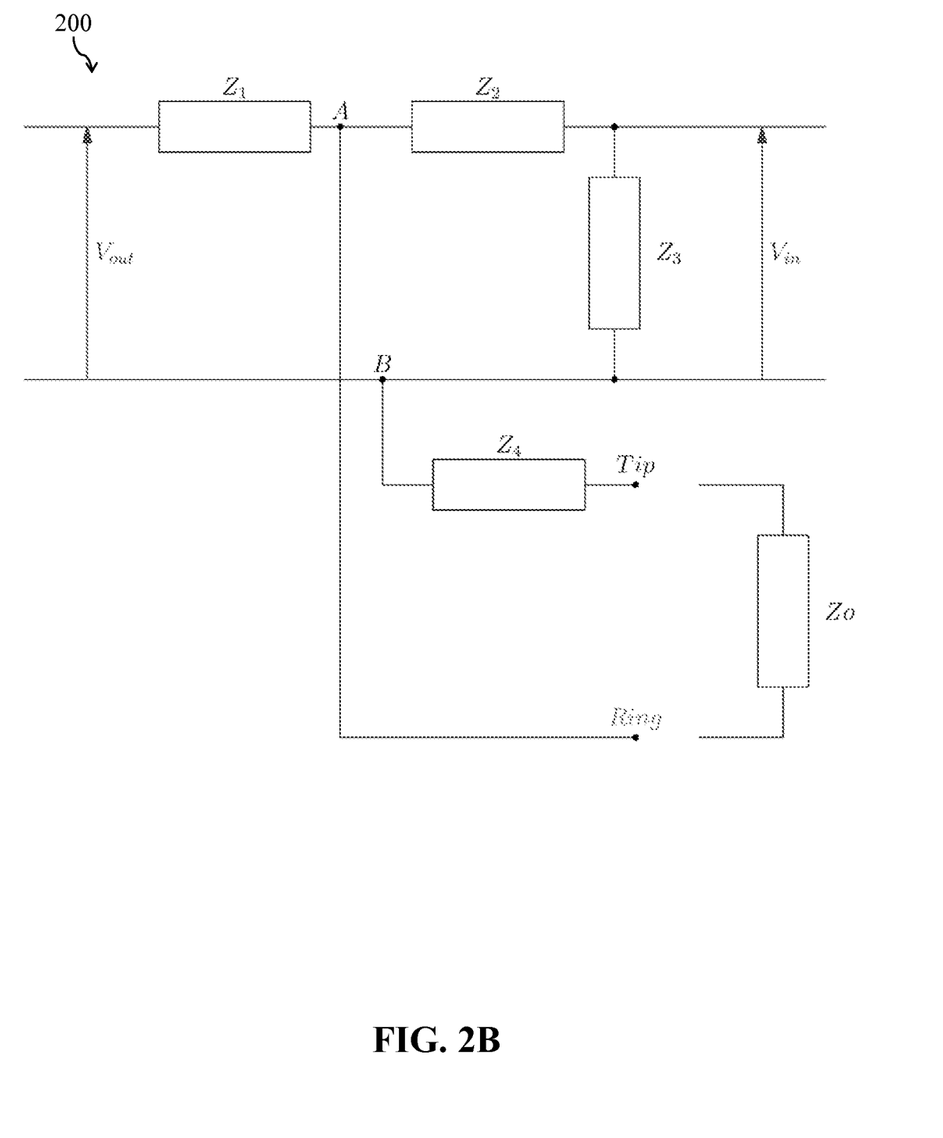
FIG. 2B is a simplified circuit diagram of the measurement circuit of FIG. 2A.

The output impedance of the DAC 210 and the input impedance of the ADC 240 are very close to zero, so the measurement circuit 200 may simplified as illustrated in FIG. 2B, where $Z_1$-$Z_4$ are impedances of the measurement circuit 200. Since the output impedance of the DAC 210 is very close to zero, the output voltage $V_{out}$ is substantially the same whether or not the transmission line is connected. Therefore, the input voltage $V_{in}$ is measured at different frequencies and is stored in memory as calibration data, e.g., in a calibration file. This calibration data is used to calculate the output voltage $V_{out}$ according to Equation (1):

$$V_{out} = \frac{V_{in}}{Z_3}(Z_1 + Z_2 + Z_3). \tag{1}$$

To calculate the characteristic impedance $Z_0$ of the transmission line, we notice that the voltage $V_{AB}$ between points A and B may be expressed according to Equation (2):

$$V_{AB} = \frac{V_{in}}{Z_3}(Z_2 + Z_3) = V_{out}\frac{(Z_0 + Z_4)\|(Z_2 + Z_3)}{(Z_0 + Z_4)\|(Z_2 + Z_3) + Z_1}, \tag{2}$$

where the symbol $\|$ means "parallel to". Using Equation (1) and renaming $V_{in}$ to $V_{inCal}$, Equation (3) is obtained:

$$\frac{V_{in}(Z_2 + Z_3)}{Z_3} = \frac{V_{inCal}(Z_1 + Z_2 + Z_3)(Z_0 + Z_4)(Z_2 + Z_3)}{Z_3(Z_0 + Z_2 + Z_3 + Z_4)\left(\frac{(Z_0 + Z_4)(Z_2 + Z_3)}{(Z_0 + Z_2 + Z_3 + Z_4)} + Z_1\right)}, \tag{3}$$

in which the characteristic impedance $Z_0$ is the only unknown. By solving for $Z_0$, Equation (4) is obtained:

$$Z_0 = \frac{((V_{out} - V_{in})Z_3 - V_{in}Z_2 - V_{in}Z_1)Z_4 - V_{in}Z_1Z_3 - V_{in}Z_1Z_2}{(V_{out} - V_{in})Z_3 - V_{in}Z_2 - V_{in}Z_1}. \tag{4}$$

To simplify, two variables T1 and T2 are assigned according to Equations (5) and (6):

$$T1 = V_{in}Z_1; \tag{5}$$

$$T2 = (V_{out} - V_{in})Z_3 - V_{in}Z_2 - V_{in}Z_1. \tag{6}$$

Using these variables, Equation (4) reduces to Equation (7):

$$Z_0 = \frac{T2Z_4 - T1Z_3 - T1Z_2}{T2}. \tag{7}$$

Figure 3:
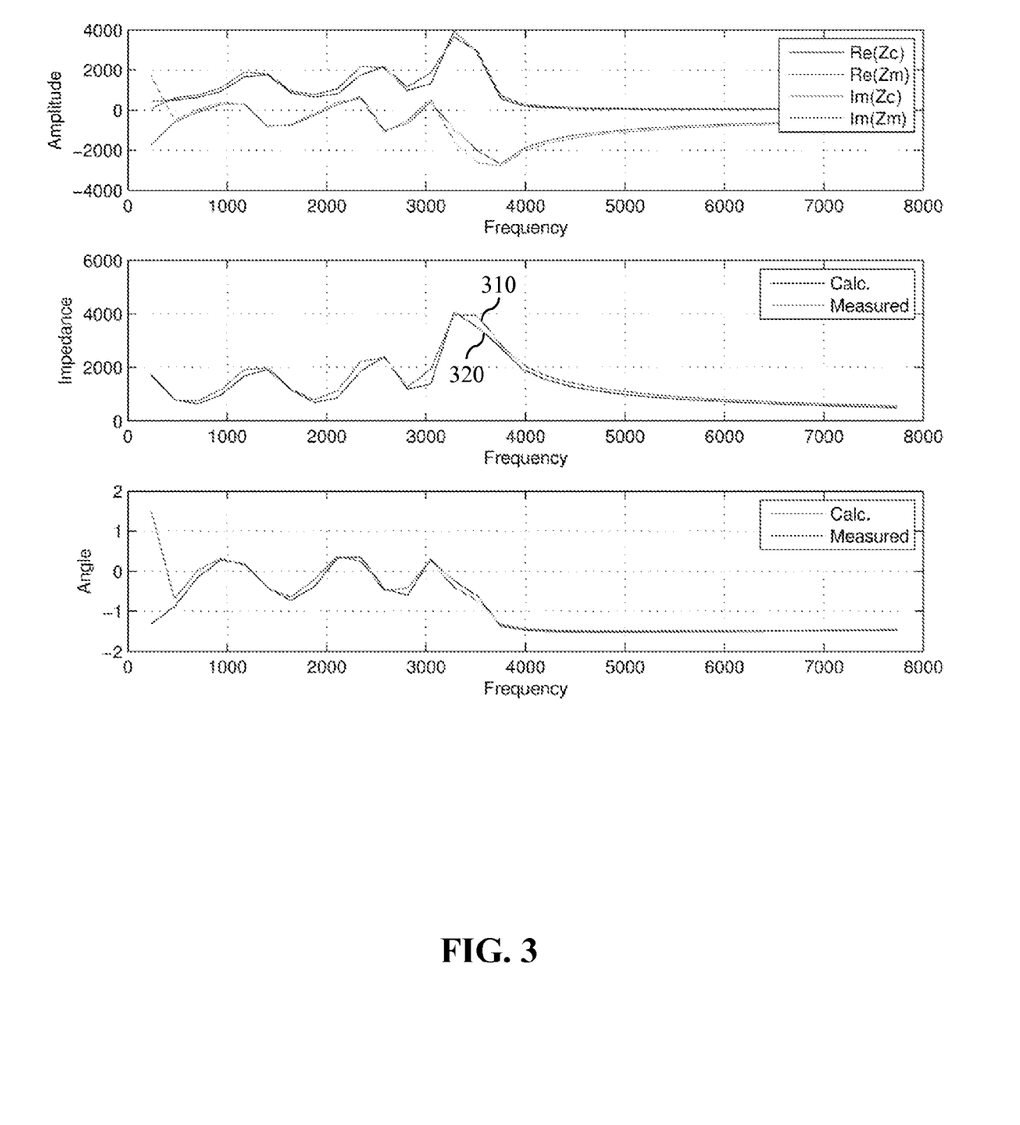
FIG. 3 is a plot of the characteristic impedances measured using the measurement circuit of FIG. 2A and calculated according to a mathematical model for a transmission line including four load coils.

Therefore, by measuring the input voltage $V_{in}$ at different frequencies, the characteristic impedance $Z_0$ of the transmission line may be determined by applying Equation (7). With reference to FIG. 3, the characteristic impedance 310 measured according to this method for a standard transmission line including four load coils is in good agreement with the characteristic impedance 320 calculated according to a mathematical model for the same transmission line. The large capacitors at the input are responsible for the angle mismatch at low frequencies.

In general, the characteristic impedance of a transmission line may be represented as a transfer function H(z) in polynomial form, having Q coefficients $b_i$ and P coefficients $a_j$, according to Equation (8):

$$H(z) = \frac{\sum_{i=0}^{Q} b_i z^{-i}}{1 + \sum_{j=1}^{P} a_j z^{-j}}. \tag{8}$$

Equation (8) may be rewritten in factored form to give Equation (9):

$$H(z) = b_0 \frac{(1 - q_1 z^{-1})(1 - q_2 z^{-1}) \ldots (1 - q_Q z^{-1})}{(1 - p_1 z^{-1})(1 - p_2 z^{-1}) \ldots (1 - p_P z^{-1})}. \tag{9}$$

As shown by Equation (9), the numerator of the transfer function H(z) has Q roots $q_i$, which correspond to the zeros of the transfer function H(z). At the zeros, the transfer function H(z), representing the characteristic impedance $Z_0$, is equal to zero. As also shown by Equation (9), the denominator of the transfer function H(z) has P roots $p_i$, which correspond to the poles of the transfer function H(z). At the poles, the transfer function H(z), representing the characteristic impedance $Z_0$, is infinite. Typically, the zeros and poles occur as complex conjugate pairs, i.e., as complex numbers $z=a+bi$ and $\bar{z}=a-bi$ having real parts a that are equal in magnitude and sign, and imaginary parts b that are equal in magnitude but opposite in sign.

For load coil detection, we are interested in the poles of the transfer function H(z) in factored form of Equation (9), because the number of complex conjugate pole pairs is equal to the number of load coils in the transmission line. Rather than attempting to find local maxima in the characteristic impedance, the present invention calculates the impulse response, i.e., the time response, of the transmission line from the characteristic impedance and determines the number of complex conjugate poles pairs from the impulse response.

As is commonly known, the impulse response of a system is the output signal when the input signal is an impulse. The transfer function of the impulse response describes the relation between the input and output signals.

According to the present invention, the impulse response of the transmission line is, typically, calculated by performing an inverse Fourier transform, e.g., an inverse fast Fourier transform (FFT), on the characteristic impedance. The number of complex conjugate pole pairs of the transfer function of the impulse response is then determined.

Typically, the transfer function of the impulse response is found by applying a parametric modeling technique to the impulse response. As is commonly known, a parametric modeling technique finds the parameters for a mathematical model describing a system, by using known information about the system. Several suitable parametric modeling techniques are available for use in the present invention, such as the Prony method, the Levinson-Durbin method, the Yule-Walker method, etc. The Prony method is presently preferred as the parametric modeling technique.

In general, the parametric modeling technique finds the coefficients $b_i$ and $a_j$ of the transfer function $H(z)$ in polynomial form of Equation (8) by using the impulse response. Once the transfer function has been found, a root-finding algorithm finds the poles and the zeros, i.e., the roots $p_i$ and $q_j$, of the transfer function $H(z)$ in factored form of Equation (9).

Typically, the parametric modeling technique requires initial guess values for the number of poles P and the number of zeros Q, i.e., the number of coefficients, of the transfer function $H(z)$. The guess values for the numbers of poles and zeros are selected to be greater than the expected numbers of poles and zeros. Typically, the guess values for the numbers of poles and zeros are the same and are greater than the expected number of poles, which is two times the expected number of load coils in the transmission line. The expected number of load coils in the transmission line, in turn, may be determined from the length of the transmission line, by considering standard spacings of load coils, e.g., a spacing of 6000 ft between load coils, and a spacing of 3000 ft before and after the first and last load coils.

Typically, the guess values for the numbers of poles and zeros are selected to be at least two times greater than the expected numbers of poles and zeros, i.e., at least four times greater than the expected number of load coils. For example, if the expected number of load coils in a transmission line is three, the expected number of poles is six, i.e., three complex conjugate pole pairs, and the guess values for the numbers of poles and zeros are each selected to be at least 12.

The transfer function found by the parametric modeling technique has poles equal in number to the guess value for the number of poles. Once the poles of the transfer function have been found by the root-finding algorithm, it is necessary to determine which of the poles are valid. Valid poles occur as complex conjugate pole pairs. Therefore, the number of complex conjugate pairs indicates the number of load coils in the transmission line.

Accordingly, complex conjugate pole pairs are identified among the poles found by the root-finding algorithm. Poles having an imaginary part b with an absolute magnitude of less than a first threshold, e.g., $|b|<0.08$, are not considered further. The remaining poles are identified as complex poles. Complex conjugate pole pairs are then identified among the complex poles by calculating distances between the complex poles and conjugates of the complex poles. If the absolute distance between a first complex pole $z_1$ and the conjugate $\bar{z}_2$ of a second complex pole is less than a second threshold, e.g., $|z_1-\bar{z}_2|<0.15$, the first complex pole $z_1$ and the second complex pole $z_2$ are identified as a complex conjugate pole pair. Ideally, the absolute distance should be zero, but in practice it is usually small because of noise and limited hardware accuracy.

The first and second thresholds are selected by taking practical limitations into consideration. Typically, the first and second thresholds are determined empirically through experimentation.

The complex conjugate pole pairs identified in this manner are considered to be valid poles. The complex conjugate pole pairs are then counted to determine the number of load coils in the transmission line, which is equal to the number of complex conjugate pole pairs.

Figure 4A:
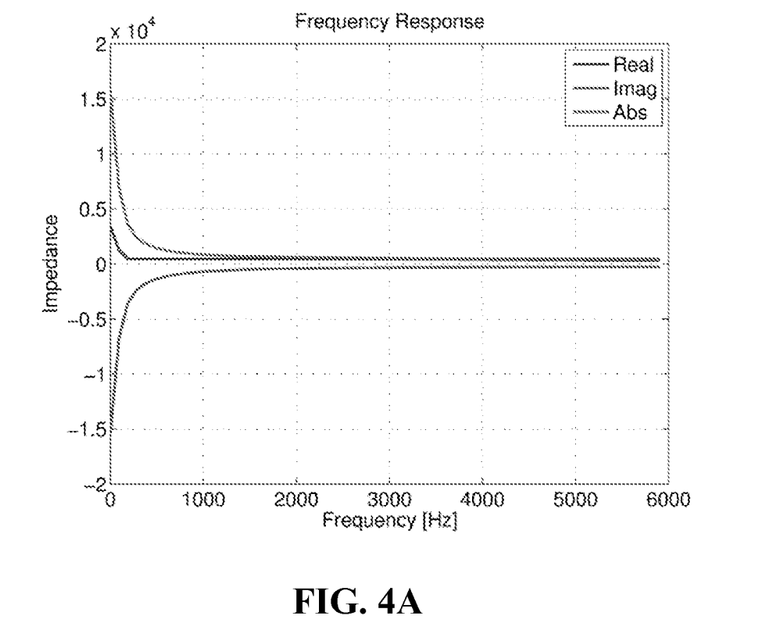
FIG. 4A is a plot of the characteristic impedance measured for a transmission line not including any load coils.
Figure 4B:
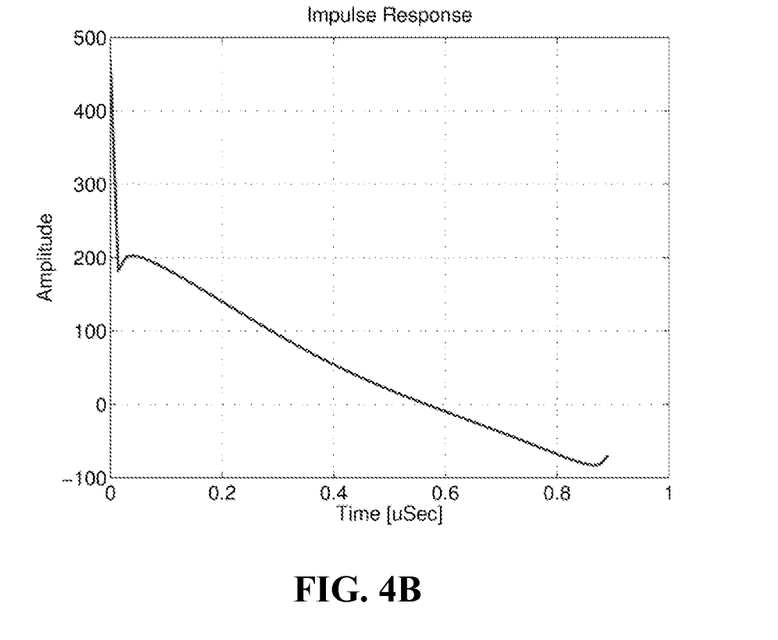
FIG. 4B is a plot of the impulse response calculated from the characteristic impedance of FIG. 4A.
Figure 4C:
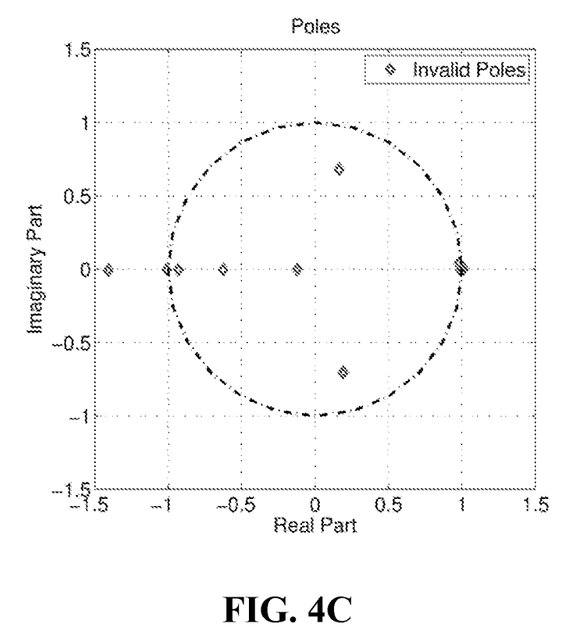
FIG. 4C is a plot of the poles of the transfer function of the impulse response of FIG. 4B.

Several examples are provided hereafter to further illustrate the present invention. With reference to FIG. 4, in a first example, the present invention was applied to a 15 000 ft transmission line not including any load coils. The characteristic impedance, i.e., the frequency response, of the transmission line, which is plotted in FIG. 4A, was measured by using the measurement circuit 200 of FIG. 2. The impulse response of the transmission line, which is plotted in FIG. 4B, was calculated by applying an inverse Fourier transform to the characteristic impedance. The transfer function of the impulse response was found by applying the Prony method to the impulse response. 10 poles of the transfer function, which are plotted in FIG. 4C, were found by using a root-finding algorithm. However, all of the poles were determined to be invalid because they did not belong to valid complex conjugate pole pairs. Therefore, the number of load coils in the transmission line was correctly determined to be zero. It should be noted that the direct current (DC) and very low-frequency response could not be detected by the alternating current (AC) coupled hardware and was approximated by extrapolation. Consequently, one pair of poles is close to a valid complex conjugate pole pair, but the absolute distance $|z_1-\bar{z}_2|$ is greater than the second threshold.

Figure 5A:
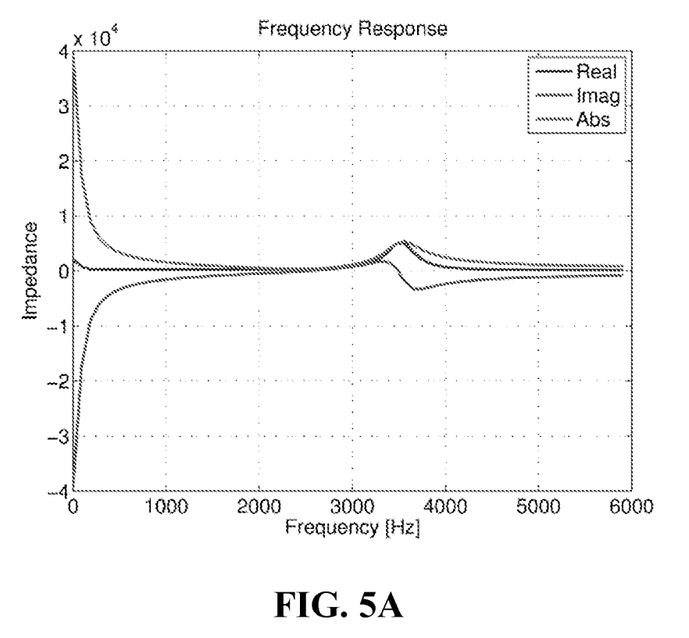
FIG. 5A is a plot of the characteristic impedance measured for a transmission line including one load coil.
Figure 5B:
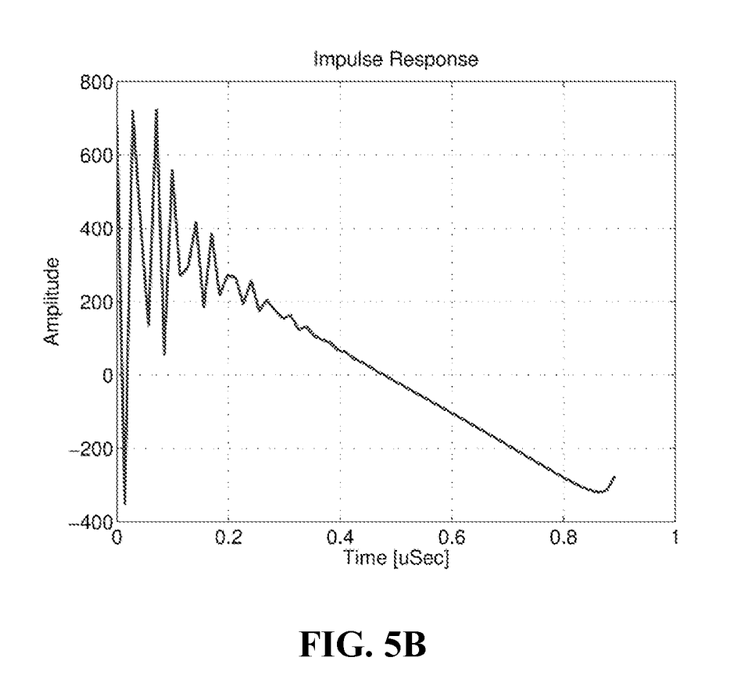
FIG. 5B is a plot of the impulse response calculated from the characteristic impedance of FIG. 5A.
Figure 5C:
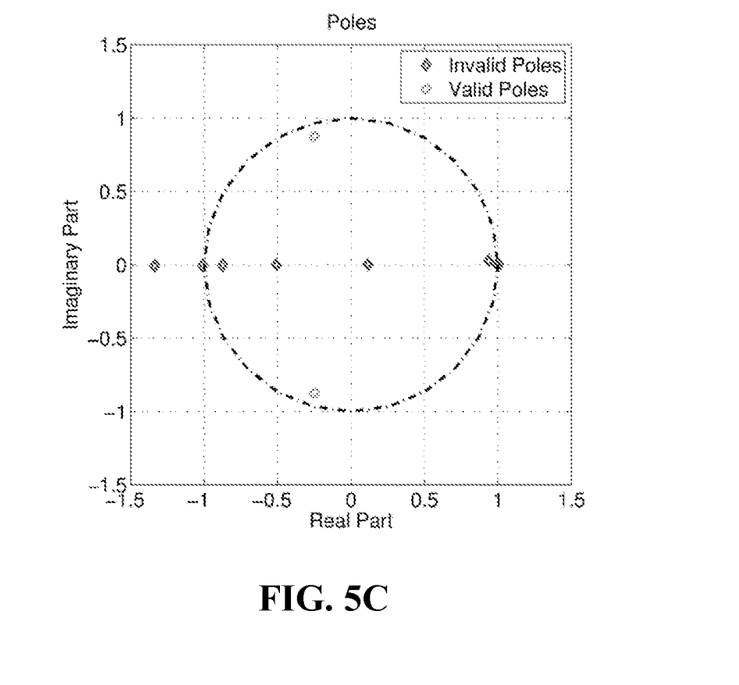
FIG. 5C is a plot of the poles of the transfer function of the impulse response of FIG. 5B.

With reference to FIG. 5, in a second example, the present invention was applied to a transmission line including one load coil (LC) at the following spacing: 3000 ft, LC, 3000 ft. The characteristic impedance, i.e., the frequency response, of the transmission line, which is plotted in FIG. 5A, was measured by using the measurement circuit 200 of FIG. 2. The impulse response of the transmission line, which is plotted in FIG. 5B, was calculated by applying an inverse Fourier transform to the characteristic impedance. The transfer function of the impulse response was found by applying the Prony method to the impulse response. 10 poles of the transfer function, which are plotted in FIG. 5C, were found by using a root-finding algorithm. Of these, one pair of poles was determined to be a valid complex conjugate pole pair. Therefore, the number of load coils in the transmission line was correctly determined to be one.

Figure 6A:
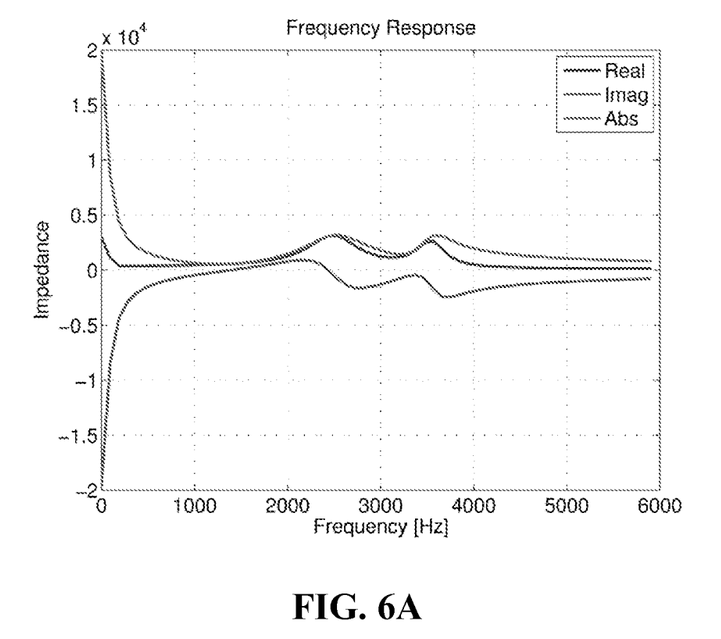
FIG. 6A is a plot of the characteristic impedance measured for a transmission line including two load coils.
Figure 6B:
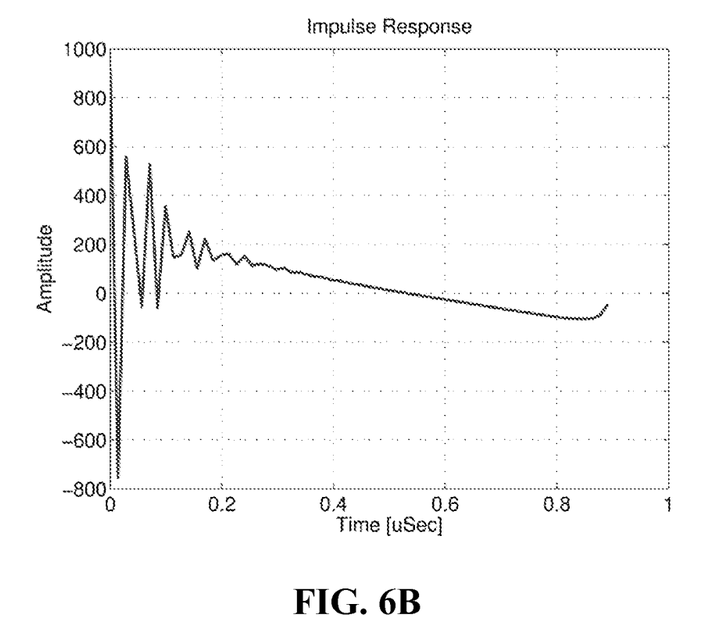
FIG. 6B is a plot of the impulse response calculated from the characteristic impedance of FIG. 6A.
Figure 6C:
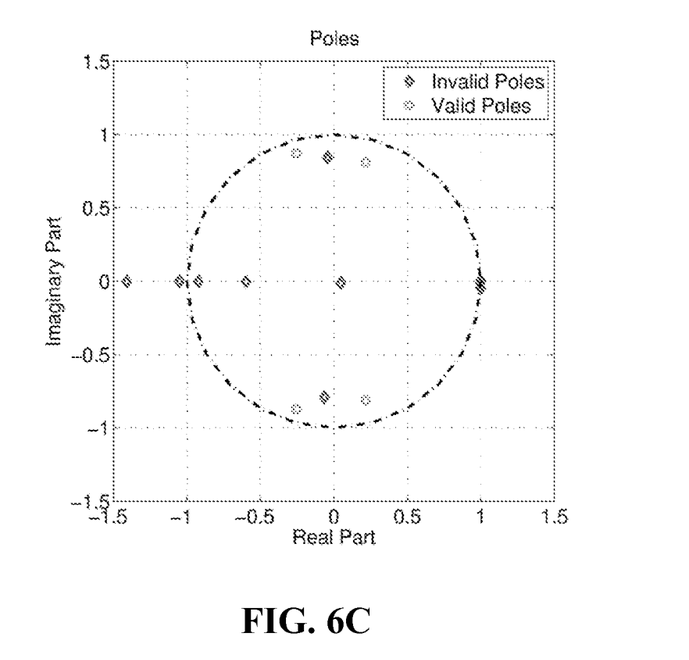
FIG. 6C is a plot of the poles of the transfer function of the impulse response of FIG. 6B.

With reference to FIG. 6, in a third example, the present invention was applied to a transmission line including two load coils (LCs) at the following spacing: 3000 ft, LC, 6000 ft, LC, 3000 ft. The characteristic impedance, i.e., the frequency response, of the transmission line, which is plotted in FIG. 6A, was measured by using the measurement circuit 200 of FIG. 2. The impulse response of the transmission line, which is plotted in FIG. 6B, was calculated by applying an inverse Fourier transform to the characteristic impedance. The transfer function of the impulse response was found by applying the Prony method to the impulse response. 14 poles of the transfer function, which are plotted in FIG. 6C, were found by using a root-finding algorithm. Of these, two pairs of poles were determined to be valid complex conjugate pole pairs. Therefore, the number of load coils in the transmission line was correctly determined to be two.

Figure 7A:
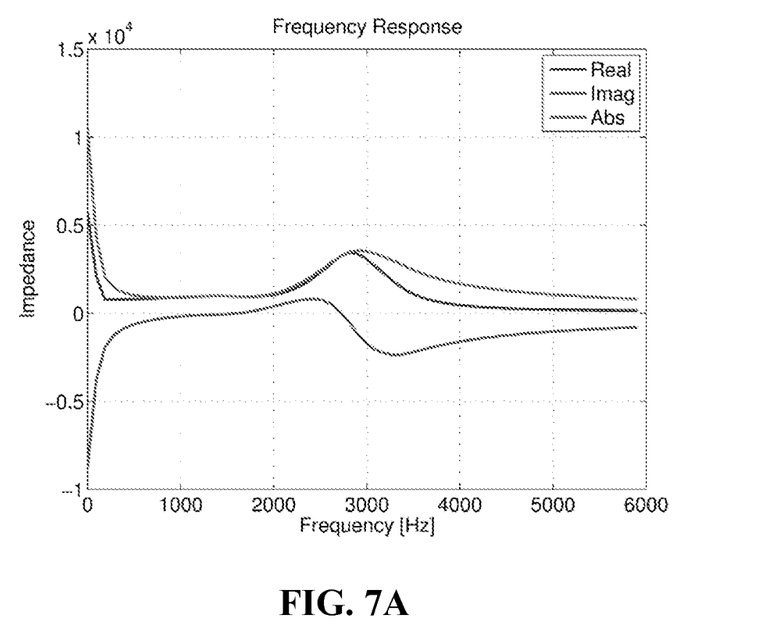
FIG. 7A is a plot of the characteristic impedance measured for a transmission line including three load coils.
Figure 7B:
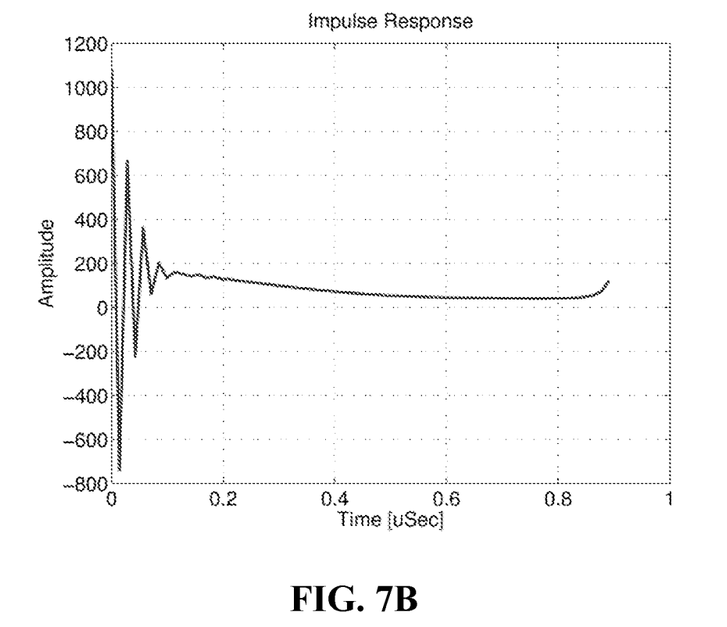
FIG. 7B is a plot of the impulse response calculated from the characteristic impedance of FIG. 7A.
Figure 7C:
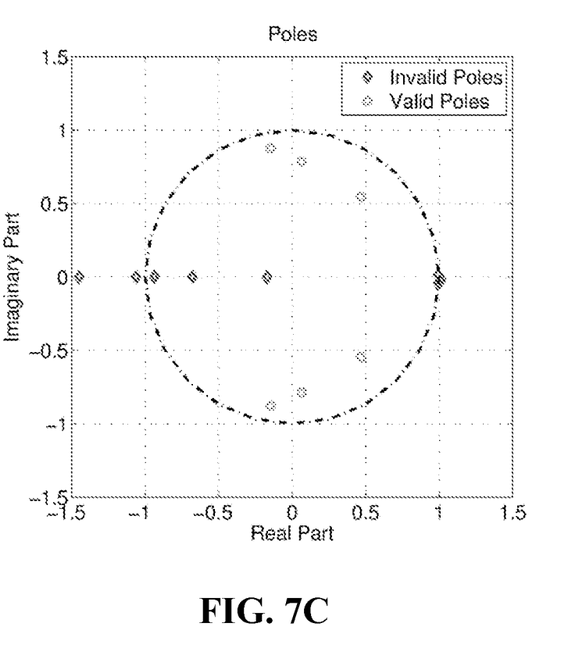
FIG. 7C is a plot of the poles of the transfer function of the impulse response of FIG. 7B.

With reference to FIG. 7, in a fourth example, the present invention was applied to a transmission line including three load coils (LCs) at the following spacing: 3000 ft, LC, 15 000 ft, LC, 6000 ft, LC, 3000 ft. The characteristic impedance, i.e., the frequency response, of the transmission line, which is plotted in FIG. 7A, was measured by using the measurement circuit 200 of FIG. 2. The impulse response of the transmission line, which is plotted in FIG. 7B, was calculated by applying an inverse Fourier transform to the characteristic impedance. The transfer function of the impulse response was found by applying the Prony method to the impulse response. 14 poles of the transfer function, which are plotted in FIG. 7C, were found by using a root-finding algorithm. Of these, three pairs of poles were determined to be valid complex conjugate pole pairs. Therefore, the number of load coils in the transmission line was correctly determined to be three.

Figure 8A:
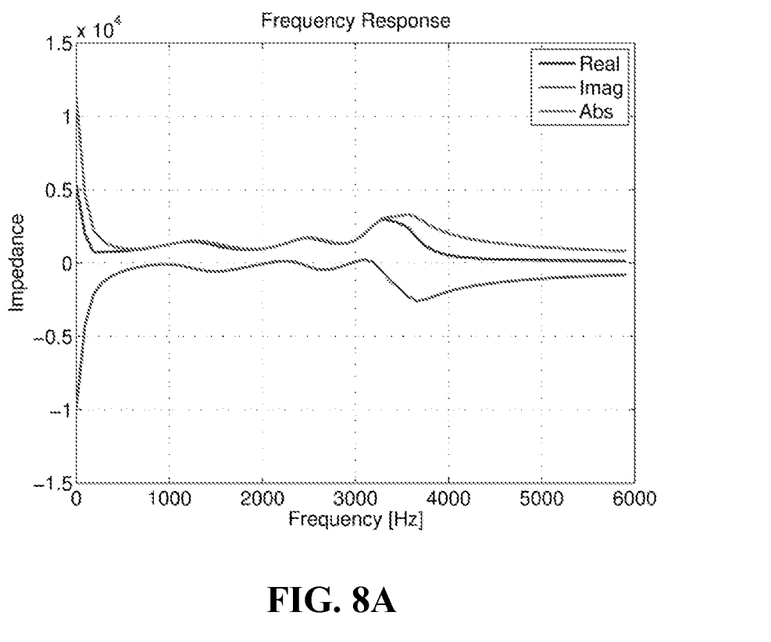
FIG. 8A is a plot of the characteristic impedance measured for a transmission line including four load coils.
Figure 8B:
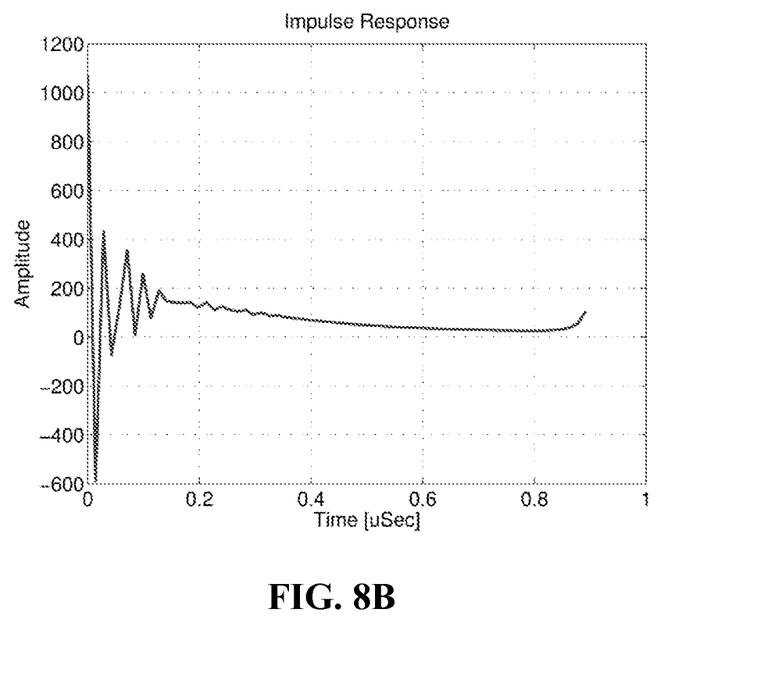
FIG. 8B is a plot of the impulse response calculated from the characteristic impedance of FIG. 8A.
Figure 8C:
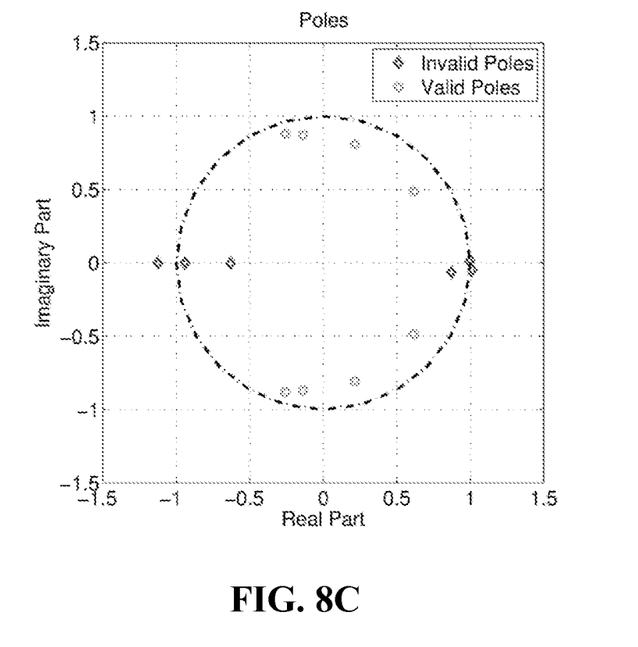
FIG. 8C is a plot of the poles of the transfer function of the impulse response of FIG. 8B.

With reference to FIG. 8, in a fifth example, the present invention was applied to a transmission line including four load coils (LCs) at the following spacing: 3000 ft, LC, 6000 ft, LC, 6000 ft, LC, 6000 ft, LC, 3000 ft. The characteristic impedance, i.e., the frequency response, of the transmission line, which is plotted in FIG. 8A, was measured by using the measurement circuit 200 of FIG. 2. The impulse response of the transmission line, which is plotted in FIG. 8B, was calculated by applying an inverse Fourier transform to the characteristic impedance. The transfer function of the impulse response was found by applying the Prony method to the impulse response. 14 poles of the transfer function, which are plotted in FIG. 8C, were found by using a root-finding algorithm. Of these, four pairs of poles were determined to be valid complex conjugate pole pairs. Therefore, the number of load coils in the transmission line was correctly determined to be four.

The present invention may be implemented in hardware, software, or a combination thereof. When implemented in software, instructions for carrying out the actions described heretofore are stored in a non-transitory computer-readable storage medium, e.g., memory, and are executed by a processor of a hardware device, e.g., a general purpose computer or a test device.

Figure 9:
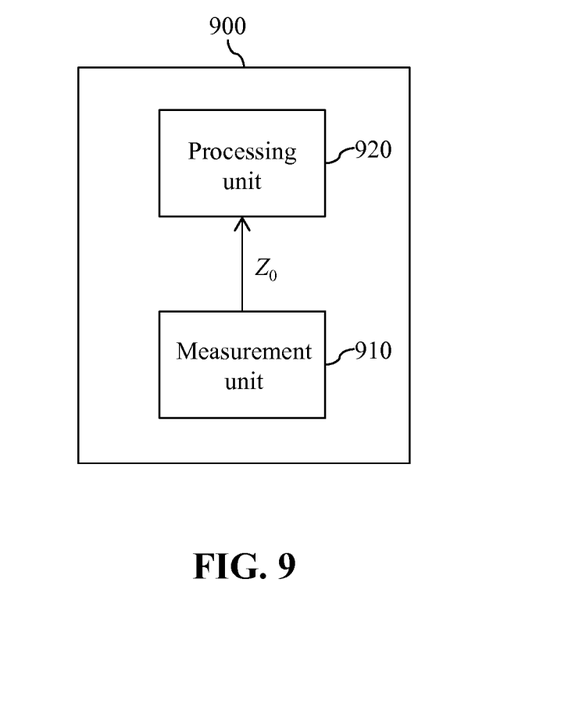
FIG. 9 is a block diagram of an exemplary embodiment of a system for determining the number of load coils in a transmission line.

With reference to FIG. 9, an exemplary system 900 for determining the number of load coils in a transmission line includes a measurement unit 910 and a processing unit 920. In a preferred embodiment, the system 900 is embodied as a test device, e.g., a portable or fixed test device, in which the measurement unit 910 and the processing unit 920 are supported by a common housing. In other embodiments, the measurement unit 910 may be embodied as a test device, e.g., a portable or fixed test device, and the processing unit 920 may be embodied as a separate hardware device or as software stored and executed by a separate hardware device, e.g., a general purpose computer.

The measurement unit 910 measures the characteristic impedance of the transmission line, typically, by means of a measurement circuit, such as the measurement circuit 200 of FIG. 2 described heretofore. The processing unit 920 calculates the impulse response of the transmission line from the characteristic impedance and determines the number of complex conjugate pole pairs of the transfer function of the impulse response, as described heretofore. Thereby, the processing unit 920 determines the number of load coils in the transmission line, which is equal to the number of complex conjugate pole pairs. Typically, the number of load coils is reported by the system 900, e.g., on a display.

It should be noted that other embodiments of the system may omit the measurement unit, which is optional. Embodiments omitting the measurement unit are suitably configured to receive the characteristic impedance, i.e., frequency-dependent impedance data, as input.

Of course, numerous other embodiments may be envisaged without departing from the spirit and scope of the invention.

I claim:

1. A method of determining a number of load coils in a transmission line having a characteristic impedance, the method comprising:
   calculating, using a processing unit, an impulse response of the transmission line from the characteristic impedance of the transmission line; and
   determining, using a processing unit, a number of complex conjugate pole pairs of a transfer function of the impulse response to thereby determine the number of load coils in the transmission line, wherein the number of complex conjugate pole pairs is equal to the number of load coils, by:
   finding the transfer function by applying a parametric modeling technique to the impulse response; and
   finding poles of the transfer function by using a root-finding algorithm, wherein the poles of the transfer function are greater in number than two times an expected number of load coils in the transmission line.

2. The method of claim 1, further comprising:
   measuring the characteristic impedance of the transmission line.

3. The method of claim 1, wherein calculating the impulse response includes performing an inverse Fourier transform on the characteristic impedance.

4. The method of claim 1, wherein the parametric modeling technique is the Prony method.

5. A method of determining a number of load coils in a transmission line having a characteristic impedance, the method comprising:
   calculating, using a processing unit, an impulse response of the transmission line from the characteristic impedance of the transmission line; and
   determining, using a processing unit, a number of complex conjugate pole pairs of a transfer function of the impulse response to thereby determine the number of load coils in the transmission line, wherein the number of complex conjugate pole pairs is equal to the number of load coils, by:
   finding the transfer function by applying a parametric modeling technique to the impulse response;
   finding poles of the transfer function by using a root-finding algorithm;
   identifying complex poles among the poles of the transfer function;
   identifying complex conjugate pole pairs among the complex poles; and
   counting the complex conjugate pole pairs.

6. The method of claim 5, further comprising:
   measuring the characteristic impedance of the transmission line.

7. The method of claim 5, wherein calculating the impulse response includes performing an inverse Fourier transform on the characteristic impedance.

8. The method of claim 5, wherein the parametric modeling technique is the Prony method.

9. A system for determining a number of load coils in a transmission line having a characteristic impedance, the system comprising:
    a processing unit for calculating an impulse response of the transmission line from the characteristic impedance of the transmission line; and for determining a number of complex conjugate pole pairs of a transfer function of the impulse response to thereby determine the number of load coils in the transmission line, wherein the number of complex conjugate pole pairs is equal to the number of load coils, by:
        finding the transfer function by applying a parametric modeling technique to the impulse response; and
        finding poles of the transfer function by using a root-finding algorithm, wherein the poles of the transfer function are greater in number than two times an expected number of load coils in the transmission line.

10. The system of claim 9, further comprising:
    a measurement unit for measuring the characteristic impedance of the transmission line.

11. The system of claim 10, wherein the system is a portable test device.

12. The system of claim 9, wherein calculating the impulse response includes performing an inverse Fourier transform on the characteristic impedance.

13. The system of claim 9, wherein the parametric modeling technique is the Prony method.

14. A system for determining a number of load coils in a transmission line having a characteristic impedance, the system comprising:
    a processing unit for calculating an impulse response of the transmission line from the characteristic impedance of the transmission line; and for determining a number of complex conjugate pole pairs of a transfer function of the impulse response to thereby determine the number of load coils in the transmission line, wherein the number of complex conjugate pole pairs is equal to the number of load coils, by:
        finding the transfer function by applying a parametric modeling technique to the impulse response;
        finding poles of the transfer function by using a root-finding algorithm;
        identifying complex poles among the poles of the transfer function;
        identifying complex conjugate pole pairs among the complex poles; and
        counting the complex conjugate pole pairs.

15. The system of claim 14, further comprising:
    a measurement unit for measuring the characteristic impedance of the transmission line.

16. The system of claim 15, wherein the system is a portable test device.

17. The system of claim 14, wherein calculating the impulse response includes performing an inverse Fourier transform on the characteristic impedance.

18. The system of claim 14, wherein the parametric modeling technique is the Prony method.

\* \* \* \* \*